Jan. 30, 1968 T. L. FAWICK 3,366,429
BEARING
Filed Sept. 13, 1965
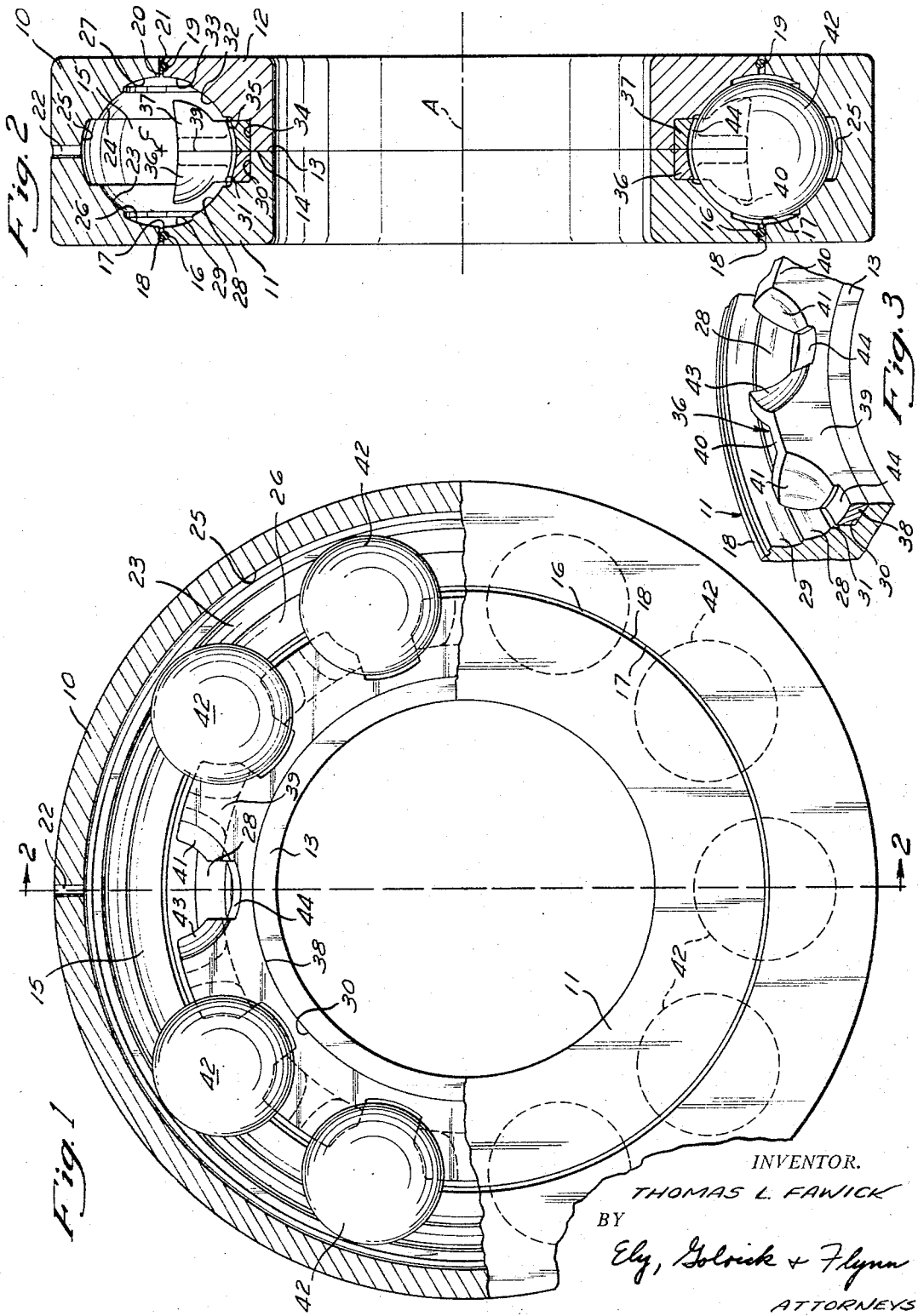
INVENTOR.
THOMAS L. FAWICK
BY
Ely, Golrick & Flynn
ATTORNEYS United States Patent Office
3,366,429
Patented Jan. 30, 1968

3,366,429
BEARING
Thomas L. Fawick, Shaker Heights, Ohio
(Hotel Statler-Hilton, Cleveland, Ohio  44101)
Filed Sept. 13, 1965, Ser. No. 486,842
8 Claims. (Cl. 308—193)

ABSTRACT OF THE DISCLOSURE

The present single-row ball bearing has a one-piece outer race and a two-piece inner race having annular confronting bearing surfaces and together defining a raceway for a plurality of balls. A pair of identical liner members are seated on the halves of the inner race, abutting axially against each other. These liner members project into the raceway and have concave bearing surface which define circumferentially-spaced pockets receiving the balls. The bearing surfaces on the liner members have substantial surface area contact with the balls. The races and the liner members have relief grooves of substantial circumferential extent at the balls which separate the respective bearing surfaces from the radial and axial centerlines of the balls to avoid the concentration of either radial or axial thrusts along these centerlines. O-rings are sealingly engaged between the outer and inner races.

---

This invention relates to a ball bearing which is adapted to sustain substantial axial thrusts in both directions, as well as serving as a radial anti-friction bearing.

Conventional single row ball bearings are not designed to withstand substantial axial thrust in both directions. Specially designed single row bearings have been used where there is to be substantial end thrust in one direction only, but where the end thrust is to be in either direction the conventional practice heretofore has been to use double row bearings. This has involved stocking the different types of bearings suitable for the different types of loading expected to be encountered in actual use. The present invention is directed to a novel and improved single row bearing which combines in a relatively uncomplicated and inexpensive structure the ability to withstand substantial axial loads in both directions as well as substantial radial loads.

Accordingly, it is the principal object of this invention to provide a novel and improved single row ball bearing which is adapted to take substantial axial thrust in both directions and substantial radial loads.

Another object of this invention is to provide such a bearing which is relatively inexpensive to manufacture and which may be readily assembled in an accurate manner.

Further objects and advantages of this invention will be apparent from the following detailed description of a presently-preferred embodiment, which is illustrated in the accompanying drawing.

In the drawing:

FIGURE 1 is a view, partly in end elevation and partly in cross-section with parts omitted for clarity, of a bearing in accordance with the present invention;

FIGURE 2 is an axial section through this bearing, taken along the line 2—2 in FIG. 1; and FIGURE 3 is a fragmentary perspective view showing one of the inner race members and the liner member therefor in this bearing.

Referring first to FIG. 2, the present bearing comprises an annular, one-piece, outer race 10 and an inner race made up of two identical halves 11 and 12. The inner race members 11 and 12 are positioned with each as a mirror image of the other and they present flat, radially extending, inner axial end faces 13 and 14, respectively, which abut against each other midway axially along the bearing. The outer and inner races together define an annular ball-receiving raceway 15 between them.

At one axial side of this ball-receiving raceway 15, a resilient O-ring 16 of rubber-like material is sealingly engaged between a radially-inward annular edge 17 on the outer race 10 and a radially-outward annular edge 18 on the inner race member 11. This O-ring 16 is seated in a groove in the edge face 18 of inner race member 11. At the opposite axial side of the ball-receiving raceway 15, a second resilient O-ring 19 of rubber-like material is similarly seated in a groove formed in a radially-outward annular edge 20 of inner race member 12, and this O-ring is sealingly engaged between this edge 20 and a radially-inward annular edge 21 on the outer race 10. In this arrangement, the ball-receiving raceway 15 between the races is substantially sealed against the entry of dirt or other foreign matter, while the outer race and the inner race may rotate with respect to one another. The outer race 10 has a radial opening 22 leading into the ball-receiving raceway 15 for the insertion of a suitable lubricant.

At the ball-receiving raceway 15 the outer race 10 presents a pair of ball-engaging, concave, annular bearing surfaces 23 and 24, which are disposed respectively on opposite sides of the axial centerline of the bearing. These bearing surfaces in axial section are both arcuate on the same radius about the annular centerline C of the ball-receiving raceway 15. Both bearing surfaces 23 and 24 extend arcuately around the entire inside circumferential extent of the outer race.

Between the respective axially inward ends of these bearing surfaces 23 and 24 the outer race presents a centrally disposed, annular relief groove 25 of substantially greater radius than that of the bearing surfaces. The outer race also has a similar relief groove 26 between its radially inward edge 17 and the axially outward end of bearing surface 23, and a similar relief groove 27 between its opposite radially inward edge 21 and the axially outward end of bearing surface 24. Both bearing surfaces 23 and 24 extend through substantially 60 degrees arcuately about the center C, and the arcuate centerlines of the respective bearing surfaces are spaced apart from each other substantially 90 degrees.

The inner race member 11 presents a ball-engaging, concave, annular bearing surface 28 which is disposed diammetrically opposite the bearing surface 24 on the outer race 10 and in axial section is arcuate through an arc of about 60 degrees, about the same center C and on the same radius as the bearing surfaces 23 and 24. A relief groove 29 extends between the axially outward end of this bearing surface 28 and the radially outward edge 18 of the inner race member 11. A deeper groove 30 is formed in the inner race member 11, extending from its axially inward edge 13 toward the axially inward end of bearing surface 28. The bottom of this groove 30 is cylindrical about the axis A of the bearing. A shallow relief groove 31 is provided between the axially inward end of bearing surface 28 and groove 30.

The opposite inner race member 12 presents a ball-engaging, concave, annular bearing surface 32 which is disposed diammetrically opposite the bearing surface 23 on the outer race 10 and is arcuate, through an arc of about 60 degrees, about the same center C and on the same radius as the aforementioned bearing surfaces 23, 24 and 28. A relief groove 33 extends between the axially outward end of this bearing surface 32 and the radially outward edge 20 of inner race member 12. A deeper groove 34 is formed in the inner race member 12, extending from its axially inward edge 14 toward the axially inward end of bearing surface 32. The bottom of this groove 34 is cylindrical about the axis A of the bearing at the same radial distance as the bottom of the corresponding groove 30 in the other inner race member 11. A shallow relief groove 35 is provided between groove 34 and the axially inward end of bearing surface 32.

In accordance with the present invention, the two-piece inner race 11, 12 of the present bearing is provided with a two-piece liner 36, 37 (FIG. 2) of suitable material, such as bronze, slidably seated in the respective grooves 30, 34. The respective halves 36, 37 of this liner register with each other at the abutting axially inward ends of the halves 11, 12 of the inner race. The respective halves 36 and 37 of this liner are identical and are positioned as mirror images of one another, abutting against each other.

Referring to FIG. 3, the liner member 36 has an annular, radially-inwardly disposed portion 38 which is snugly, but removably, seated in the groove 30 in the inner race member 11. Liner member 36 presents a radially-disposed, annular, axially inward end face 39 which is substantially coplanar with the axially inward end face 13 of inner race member 11. This end face 39 is continuous throughout the entire radial depth of groove 30 and it also projects radially beyond this groove and into the raceway 15 between the outer and inner races of the bearing at circumferentially spaced projecting segments 40 of the liner member 36. Each of these projecting segments presents a first concave end face 41 disposed within the raceway 15 and having a curvature complementary to that of a corresponding ball 42 (FIG. 1) in the bearing, and circumferentially spaced from the first end face it presents an opposite second concave end face 43, also disposed within the raceway 15 and having a curvature complementary to that of the next ball 42 in the bearing. At each projection 40, the aforementioned radially-disposed, inner axial end face 39 of liner member 36 extends between the first concave end face 41 and the opposite concave end face 43 of that same projection. At its axially outward side the liner member 36 at each projection 40 is spaced from the ball-engaging bearing surface 28 on the corresponding inner race member 11, as shown in FIG. 2.

From FIG. 3 it will be apparent that the first end face 41 of one projection 40 and the second end face 43 of the next projection (in a counterclockwise direction) together define a ball-receiving recess at which the concave bearing surface of 28 of the inner race member 11 is exposed for engagement by the respective ball 42. The liner member 36 has a relief groove 44 disposed between the radially inward ends of each pair of confronting, ball-engaging concave faces 41 and 43.

As already stated, the liner member 37 seated on the other inner race member 12 is a mirror image of liner member 36, and therefore the detailed description of its structure will not be repeated. When the bearing is assembled, the recesses on the two liner members 36, 37 register with each other and they provide pockets for receiving the balls 42 individually.

A suitable adhesive is provided at the abutting inner axial end faces of the inner race members 11, 12 to secure them together and at the liner members 36, 37 to secure them together (separate from the inner race members) when the bearing is assembled.

When the bearing is assembled with the respective liner members in place, each ball 42 in the bearing has large surface area contact with each concave end face 41 and 43 at the respective recess on liner member 36 and with each corresponding concave end face on the other liner member 37. Also, each ball has substantially arcuate line contact with each of the bearing surfaces 23, 24, 28 and 32 on the races.

The relief grooves 26, 29 and 27, 33 in the races have substantial circumferential extent at the balls and they avoid the concentration of axial thrust along the axially extending centerline of each ball by spacing the bearing surfaces on the races substantially from this centerline. Axial thrust is transmitted through the balls to these bearing surfaces, which are spaced by the relief grooves far enough outward from this centerline that the axial thrust is more evenly distributed over the entire bearing surface. The relief groove 25 in the outer race and the relief grooves 44 in the liner have the same effect for radial loads, spacing the bearing surfaces on the races substantially away from the radially extending centerline of each load and causing such loads to be transmitted more evenly over these bearing surfaces, instead of being concentrated near the radially extending centerline of each ball.

The present bearing is relatively simple in construction and mode of assembly, both inner race members 11 and 12 being identical and interchangeable, and the same being true of the liner members 36 and 37. At the same time, the completed bearing has a greatly enhanced practical utility by virtue of its ability to act as a thrust bearing in addition to being a radial bearing.

While a presently-preferred embodiment of this invention has been described in detail herein and illustrated in the accompanying drawing, it is to be understood that various modifications, omissions and refinements which depart from the disclosed embodiment may be adopted without departing from the spirit and scope of the present invention.

I claim:

1. A bearing comprising:
    an annular outer race presenting a pair of axially spaced, confronting, annular, ball-engaging, bearing surfaces;
    a two-piece inner race composed of opposite confronting inner race members which abut against each other at their respective inner axial ends, said inner race members presenting a pair of axially spaced, confronting, annular, ball-engaging, bearing surfaces;
    said outer and inner races being positioned in radially confronting relationship and together defining an annular, ball-receiving raceway;
    a plurality of balls in said raceway engaged between said outer and inner races in rolling contact with said bearing surfaces;
    said inner race members at their abutting inner axial ends having annular grooves which register with each other;
    and a pair of liner members seated individually in said grooves respectively and abutting axially against each other, said liner members projecting into said raceway and presenting thereat concave bearing surfaces which together define a plurality of circumferentially-spaced pockets receiving said balls individually, said bearing surfaces on the liner members each having substantial surface area contact with said balls.

2. A bearing according to claim 1, wherein said bearing surfaces on the races are continuous annular surfaces which in axial cross-section are arcuate about the center of said raceway at substantially the same radial distance from said last-mentioned center, and said races and said liner present relief grooves of substantial circumferential extent at the balls which separate said bearing surfaces substantially from both the radially extending centerline and the axially extending centerline of each ball.

3. A bearing according to claim 2, wherein said inner race members are substantially identical to one another, and said liner members are substantially identical to one another.

4. A bearing accordingly to claim 2, and further comprising sealing members sealingly engaged between the outer race and the inner race members on opposite axial sides of said annular, ball-receiving raceway.

5. A bearing according to claim 2, wherein each liner member has a radially disposed, flat, inner axial end face which is substantially coplanar with the inner axial end face of the corresponding inner race member throughout substantially the entire extent of said liner member in the respective groove and radially outward beyond the respective groove.

6. A bearing comprising:
   outer and inner annular races which together define an annular, ball-receiving raceway, each of said races presenting bearing surfaces on opposite axial sides of the center of said raceway;
   a plurality of balls in said raceway in rolling contact with said bearing surfaces;
   one of said races comprising a pair of confronting race members on opposite axial sides of said raceway;
   and a liner comprising a pair of confronting liner members seated respectively on said confronting race members and projecting into said raceway and together defining a plurality of circumferentially spaced ball-receiving pockets which receive said balls individually;
   said bearing surfaces on the races being continuous annular surfaces which in axial cross-section are arcuate about the center of said raceway and at substantially equal radial distances from said center;
   and said races and said liner presenting relief grooves of substantial circumferential extent at said balls which separate said bearing surfaces substantially from both the axially extending centerline and the radially extending centerline of each ball.

7. A bearing according to claim 6, wherein said liner members abut axially against each other and present concave bearing surfaces which have substantial surface area contact with said balls.

8. A bearing comprising:
   outer and inner annular races which together define an annular, ball-receiving raceway, each of said races presenting bearing surfaces on opposite axial sides of the center of said raceway;
   a plurality of balls in said raceway in rolling contact with said bearing surfaces;
   one of said races comprising a pair of confronting race members on opposite axial sides of said raceway;
   a liner comprising a pair of confronting liner members seated respectively on said confronting race members and projecting into said raceway and together defining a plurality of circumferentially spaced ball-receiving pockets which receive said balls individually;
   and sealing members sealingly engaged between the outer and inner races on opposite axial sides of said annular, ball-receiving raceway.

References Cited
UNITED STATES PATENTS 2,977,161    3/1961    Cobb _____ 308—201

MARTIN P. SCHWADRON, *Primary Examiner.*

FRANK SUSKO, *Examiner.*